United States Patent [19]

Fenimore et al.

[11] 4,228,420
[45] Oct. 14, 1980

[54] MOSAIC OF CODED APERTURE ARRAYS

[75] Inventors: Edward E. Fenimore; Thomas M. Cannon, both of Los Alamos, N. Mex.

[73] Assignee: The United States Government as represented by the United States Department of Energy, Washington, D.C.

[21] Appl. No.: 942,228

[22] Filed: Sep. 14, 1978

[51] Int. Cl.$^3$ .......................... G02B 5/00; G03B 5/17
[52] U.S. Cl. .............. 340/146.3 F; 250/320; 350/162 ZP
[58] Field of Search ....... 350/162 R, 162 SF, 162 ZP, 350/319; 358/5; 250/550, 505, 363, 237 R, 237 G, 445 T, 227, 320; 340/146.3 F, 146.3 P

[56] References Cited

U.S. PATENT DOCUMENTS

| | | | |
|---|---|---|---|
| 3,264,611 | 8/1966 | Lohmann | 350/162 ZP |
| 3,652,855 | 3/1972 | McIntyre et al. | 250/227 |
| 3,700,895 | 10/1972 | Dicke | 250/550 |
| 3,748,470 | 7/1973 | Barrett | 250/320 |
| 3,829,688 | 8/1974 | Barrett | 250/320 |
| 3,831,031 | 8/1974 | Barrett et al. | 250/320 |
| 3,860,821 | 1/1975 | Barrett | 250/363 |
| 3,882,310 | 5/1975 | Barrett | 250/320 |
| 4,000,949 | 1/1977 | Watkins | 350/162 SF |
| 4,013,338 | 3/1977 | Sato et al. | 350/162 SF |
| 4,036,552 | 7/1977 | Lee et al. | 350/162 ZP |
| 4,165,462 | 8/1979 | Macovski et al. | 250/445 T |

*Primary Examiner*—Leo H. Boudreau
*Attorney, Agent, or Firm*—James E. Denny; Paul D. Gaetjens; William W. Cochran, II

[57] ABSTRACT

The present invention pertains to a mosaic of coded aperture arrays which is capable of imaging off-axis sources with minimum detector size. Mosaics of the basic array pattern create a circular on periodic correlation of the object on a section of the picture plane. This section consists of elements of the central basic pattern as well as elements from neighboring patterns and is a cyclic version of the basic pattern. Since all object points contribute a complete cyclic version of the basic pattern, a section of the picture, which is the size of the basic aperture pattern, contains all the information necessary to image the object with no artifacts.

4 Claims, 7 Drawing Figures

OFF AXIS SOURCE
WITH URA

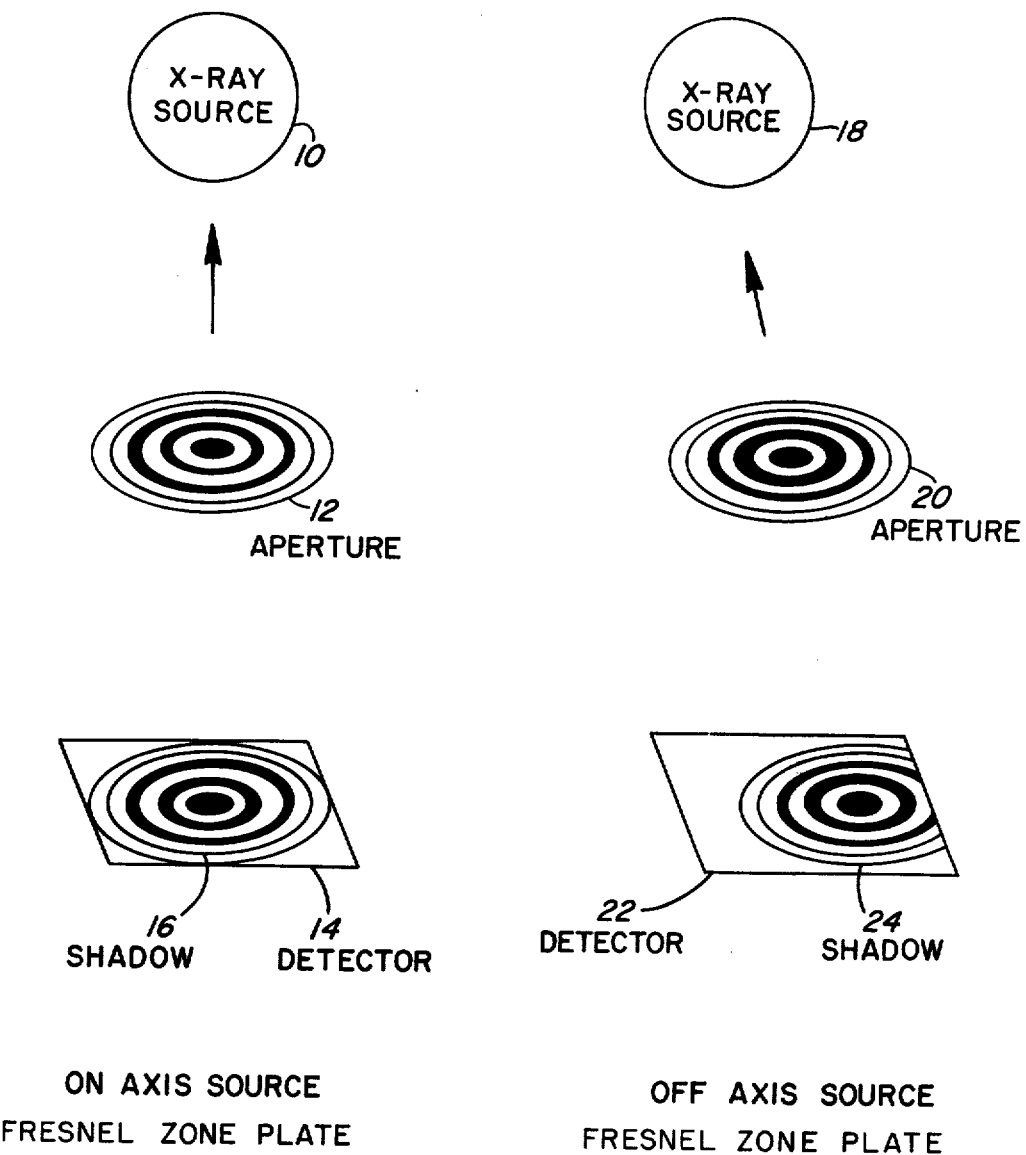

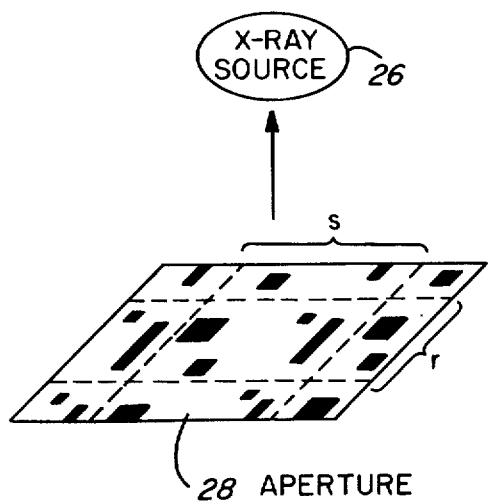
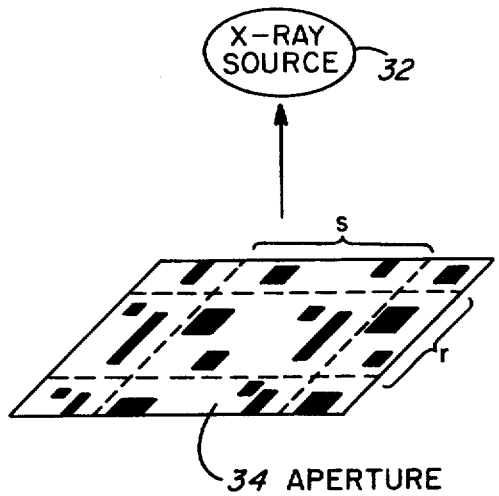
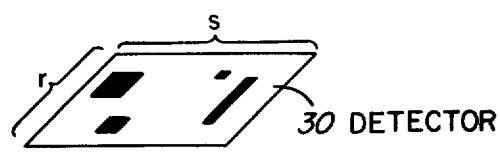
ON AXIS SOURCE
WITH URA
*Fig. 3*
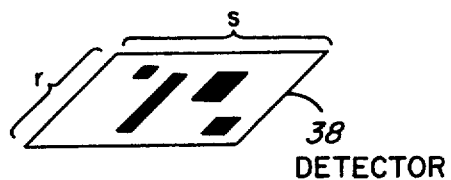
OFF AXIS SOURCE
WITH URA
*Fig. 4*
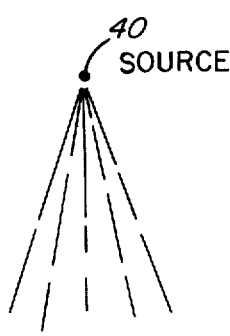
*Fig. 5*
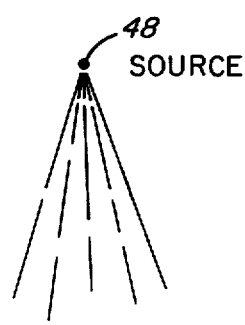
*Fig. 6*
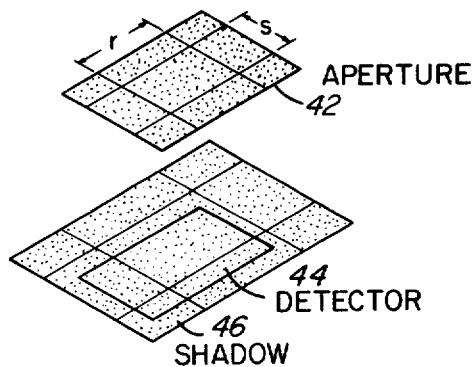
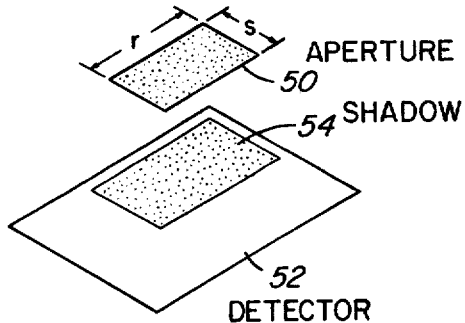

MOSAIC OF CODED APERTURE ARRAYS

BACKGROUND OF THE INVENTION

The present invention pertains generally to coded aperture imaging systems and more particularly to mosaicking of coded apertures.

The basic system utilizing a uniformly redundant array is disclosed in copending application Ser. No. 902,183 entitled "Coded Aperture Imaging With Uniformly Redundant Arrays" filed May 2, 1978 by Edward E. Fenimore and Thomas M. Cannon.

As disclosed in the above-referenced application, the prior art methods of coded aperture imaging have been unable to achieve good noise handling characteristics and pure delta function response with zero sidelobes to eliminate artifacts from the reconstructed image. A primary source of these artifacts results from disengagement of the autocorrelation (A) or balanced correlation function (G) with the original array during computer processing.

Moreover, imaging off-axis sources creates additional problems. As shown in FIG. 1, a source 10 which is on-axis with the aperture 12 projects a shadow 16 so that complete information of the source is provided to detector 14. As shown in FIG. 2, a source 18 is off-axis with aperture 20 and detector 22 so that complete shadow 24 is not projected onto the detector 22. Therefore, the detector 22 must be larger than the actual aperture size to insure that the detector records the entire aperture pattern from all sources within its field of view. For many applications including x-ray astronomy, large detectors are a major disadvantage due to space limitations and increased costs. Obviously, the reconstructed image is decoded with degraded resolution, if the entire image is not observed on the detector.

SUMMARY OF THE INVENTION

The present invention overcomes the disadvantages and limitations of the prior art by providing a mosaic of aperture arrays. The present invention utilizes either a mosaic aperture or mosaic decoding array to overcome the associated disadvantages and limitations of disengagement and provide a decoded image with zero sidelobes and minimal artifacts.

In accordance with the present invention an imaging arrangement for a coded aperture imaging system comprises a mosaic array aperture formed from a basic r by s array enabling cyclic versions of the r by s array adjacent to and surrounding the basic r by s array, a source of nonfocusable radiation, and means for detecting an encoded image of the source of nonfocusable radiation, said encoded image formed from a plurality of overlapping images of the source of nonfocusable radiation produced by the mosaic array aperture on the means for detecting, said means for detecting having a detector area approximately equal to said basic r by s array, whereby the imaging arrangement is capable of off-axis imaging of the source of nonfocusable radiation while maintaining a complete cyclic version of the basic r by s array for all object points imaged on said means for detecting without increasing the detector area.

It is therefore an object of the present invention to provide a mosaic of aperture arrays.

It is also an object of the present invention to provide a mosaic of uniformly redundant coded aperture arrays.

It is also an object of the present invention to provide a mosaic of coded aperture arrays which minimizes detector size.

Another object of the present invention is to provide a mosaic of coded aperture arrays which contains complete imaging information within a section of the encoded image having a size the same as the projected shadow of the basic aperture pattern.

Other objects and further scope of applicability of the present invention will become apparent from the detailed description given hereinafter. The detailed description, indicating the preferred embodiment of the invention, is given only by way of illustration since various changes and modifications within the spirit and scope of the invention will become apparent to those skilled in the art from this detailed description. The foregoing Abstract of the Disclosure is for the purpose of providing a nonlegal brief statement to serve as a searching and scanning tool for scientists, engineers and researchers, and is not intended to limit the scope of the invention disclosed herein, nor is it intended to be used in interpreting or in any way limiting the scope or fair meaning of the appended claims.

BRIEF DESCRIPTION OF THE DRAWINGS

FIG. 1 is a prior art illustration of a typical on-axis imaging situation.

FIG. 2 is a prior art illustration of a typical off-axis imaging situation.

FIG. 3 is an illustration of a mosaic aperture with an on-axis source.

FIG. 4 is an illustration of a mosaic aperture with an off-axis source.

FIG. 5 is an illustration of a coded aperture system employing a 2r by 2s aperture composed of a mosaic of basic r by s patterns.

FIG. 6 is an illustration of a coded aperture imaging system employing a basic r by s pattern which is utilized in conjunction with a mosaic decoding array.

DETAILED DESCRIPTION OF THE PREFERRED EMBODIMENT OF THE INVENTION

Figure 7:
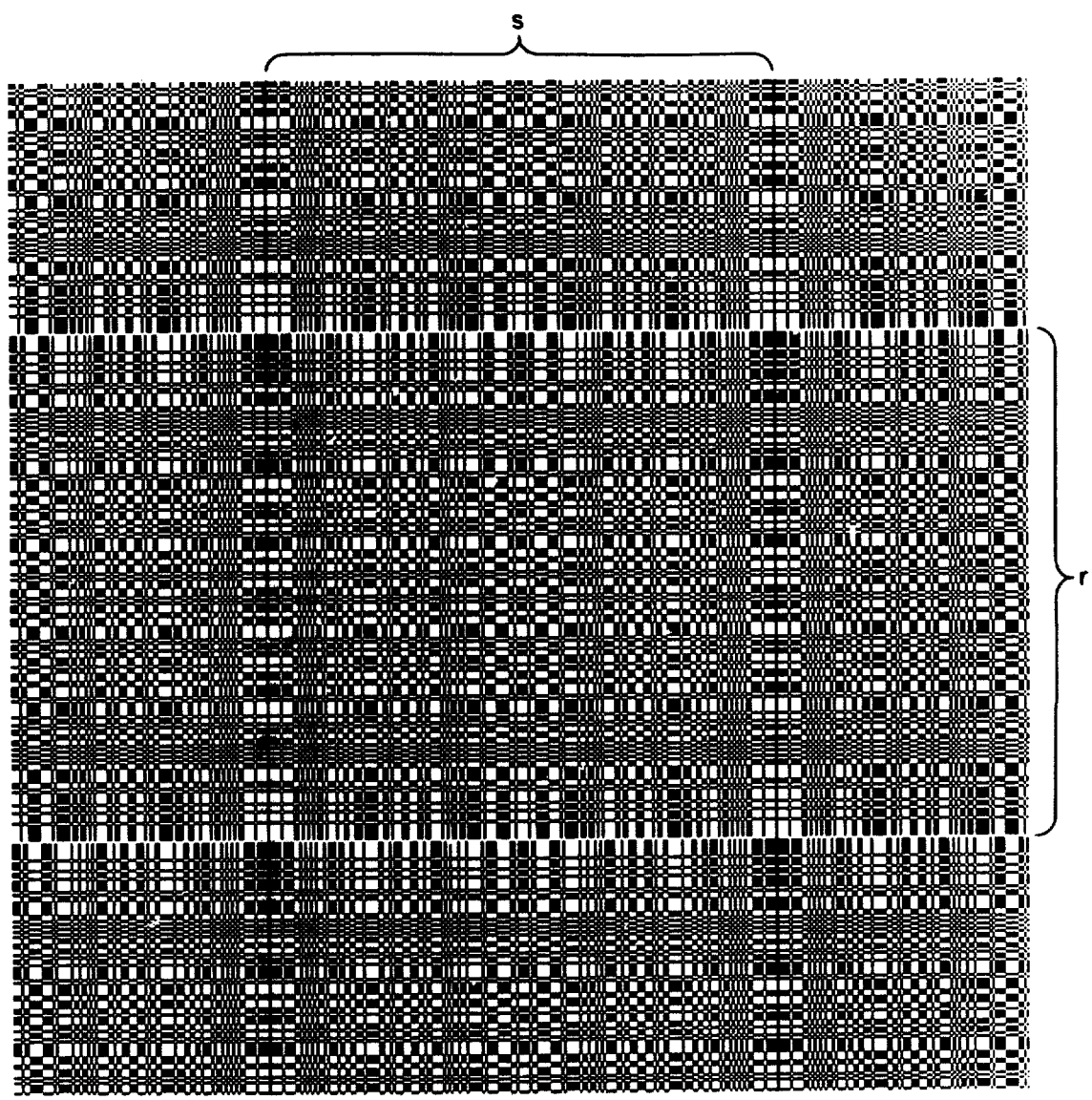
FIG. 7 is an example of a mosaic of uniformly redundant arrays of a basic r by s pattern.

FIG. 3 is an illustration of on-axis imaging according to the present invention, wherein aperture 28 is a plurality of basic arrays arranged in a mosaic. As shown, the alignment of the source 26, aperture 28 and detector 30 provides the basic uniformly redundant array (URA) pattern imaged on the detector 30. FIG. 4 illustrates off-axis imaging according to the present invention wherein source 32 projects an adjacent mosaic section of the URA pattern from aperture 34 onto detector 38. Since the mosaic aperture 34 forms a circular correlation of the source 32, the detector 38, which is the same size as the basic URA pattern (assuming the source is at infinity), contains all the information needed to reconstruct the source 32.

FIG. 5 also illustrates an off-axis imaging system. The basic aperture pattern is r·c by s·c in physical size where c is the size of the smallest pinhole in the aperture 42. Again, an object point, i.e., source 40, is within the field of view and projects a shadow 46 on detector 44 which has an area of a section of shadow 46 which is r·c by s·c in size. This section consists of some elements of the central basic pattern as well as elements from neighboring patterns and is a cyclic version of the basic pattern.

As long as all object points contribute a complete cyclic version of the basic pattern, the r·c by s·c section of the picture plane contains all information necessary to unfold the object with a system point spread function equal to a delta function.

The imaging of extended objects places additional geometrical constraints on the imaging system. The condition that all points contribute one, and only one, complete cycle determines how much mosaicking is necessary. If the object has an angular size of t by t rad, the object array, $O(i,j)$ will be a T by T array where $T=t \cdot f/c$, where f is the distance from the aperture to the detector. Thus, assuming that the camera is pointed toward the center of the object, the mosaicking must provide a border of width T/2 elements, that is, T·c/2 in physical size, around the central pattern.

The size of the object also dictates the minimum size of the basic aperture pattern. In general A*G has a plurality of peaks, e.g., one every time $mod_r k = 0$ and $mod_s l = 0$, where A represents the aperture and G represents the postprocessing balanced correlation array. These peaks in A*G result in the reconstructed object consisting of a mosaic of reconstructed objects. Since only a single version of the reconstructed objects is required, care must be taken to ensure that different versions do not overlap. This is accomplished by making r and s greater than T. Thus if the aperture is an r by s basic pattern mosaicked to produce a border width $\geq r/2$, the resulting system point spread function will be a delta function for objects smaller than approximately $r \cdot \Delta \alpha$ by $s \cdot \Delta \alpha$ rad, where $\Delta \alpha = c/f$.

The maximum size object using the aperture described above is r·c/f by s·c/f. r (with s=r−2) and c are limited basically by the detector design. c is usually set to be about equal to the resolution of the detector and r is set by the number of resolution elements across the detector. Some objects larger than r·c/f by s·c/f can be imaged by a system in which the aperture consists of a u by v mosaic of basic URA patterns. Such a system is called a multiplexed uniformly redundant array (MURA) camera and would have a field of view equal to (u−1)r·c/f by (v−1)s·c/f rad. The MURA provides an image of the object provided the emitting portion of the field of view is confined to less than an r·c/f by s·c/f area. The reconstructed image wil be a u−1 by v−1 mosaic of r·c/f by s·c/f images for which a simple imaging device with very coarse resolution is used to decide which mosaic image is the true image.

FIG. 6 discloses another possible arrangement for imaging using a larger detector. In this arrangement the aperture consists of a single basic r by s aperture pattern while the detector is large enough to contain the entire picture which is imaged from an off-axis position. Disengagement is prevented by using a mosaic decoding array within the processing circuitry. This arrangement is used where detector size is not a limitation.

FIG. 7 is an example of a mosaic of uniformly redundant arrays having a basic r by s array pattern. As shown, the mosaic array has a physical size of 2r by 2s such that it consists of a cyclic version of the basic pattern containing elements from neighboring patterns. The procedure for generating a mosaic array such as shown in FIG. 7, is disclosed in the above referenced copending application.

The present invention therefore provides a mosaicked imaging system which eliminates artifacts generated by disengagement and overcomes the disadvantages and limitations of imaging off-axis sources. As a result, smaller detectors can be utilized in conjunction with the mosaic aperture where space limitations would otherwise preclude their use.

Obviously any modifications and variations of the present invention are possible in light of the above teachings. For example, it is clear that aperture patterns other than the URA such as random arrays, Fresnel zone plates, off-axis Fresnel zone plates, nonredundant arrays, and annuli can be used in a mosaic to obtain a system employing a minimum detector area. It is therefore to be understood that within the scope of the appended claims the invention may be practiced otherwise than as specifically described.

What is claimed is:

1. An imaging arrangement for a coded aperture imaging system comprising:
    a source of nonfocusable radiation;
    a position sensitive detector;
    mosaic array aperture means formed from a basic r by s array and neighboring cyclic versions of said basic r by s array adjacent to said basic r by s array, said mosaic array aperture means substantially aligned with said source of nonfocusable radiation and said position sensitive detector to form an encoded aperture image;
    said encoded aperture image formed by a circular correlation of said mosaic aperture array and said source of nonfocusable radiation such that all object source points of said source of nonfocusable radiation contribute a complete cyclic version of said basic r by s array within a minimal detector area for sources aligned off axis;
    means for reconstructing an image of said source from said encoded aperture image.

2. The imaging arrangement of claim 1 wherein said mosaic array aperture consists of a basic r by s uniformly redundant array and neighboring arrays to form a 2r by 2s aperture.

3. The aperture of claim 1 wherein said basic r by s array comprises a uniformly redundant array.

4. The aperture of claim 1 wherein said basic r by s array comprises a random array.

* * * * *